(12) United States Patent
Gard

(10) Patent No.: US 8,402,637 B2
(45) Date of Patent: Mar. 26, 2013

(54) VEHICLE FIXTURE WITH ALIGNMENT TARGET

(75) Inventor: Randy L. Gard, Grand Island, NE (US)

(73) Assignee: Chief Automotive Technologies, Inc., Grand Island, NE (US)

( * ) Notice: Subject to any disclaimer, the term of this patent is extended or adjusted under 35 U.S.C. 154(b) by 893 days.

(21) Appl. No.: 12/264,762

(22) Filed: Nov. 4, 2008

(65) Prior Publication Data

US 2010/0107394 A1    May 6, 2010

(51) Int. Cl.
    *B23P 25/00* (2006.01)
(52) U.S. Cl. .................................................... 29/710
(58) Field of Classification Search ............... 29/402.01, 29/402.19, 406, 407.01, 407.05, 407.09, 29/464, 466, 468, 705, 710, 712, 718, 721, 29/271, 281.6, 283; 33/600
    See application file for complete search history.

(56) References Cited

U.S. PATENT DOCUMENTS

| | | |
|---|---|---|
| 3,658,424 A | 4/1972 | Elliott |
| 3,816,000 A | 6/1974 | Fiedler |
| 3,888,100 A | 6/1975 | Chisum |
| 3,900,263 A | 8/1975 | Hall, Jr. |
| 4,015,338 A | 4/1977 | Kunza et al. |
| 4,088,006 A | 5/1978 | Patten |
| 4,131,021 A | 12/1978 | Mezrich et al. |
| 4,313,335 A | 2/1982 | Eck |
| RE31,636 E | 7/1984 | Chisum |
| 4,513,508 A | 4/1985 | Jarman et al. |
| 4,520,649 A | 6/1985 | Barton |
| 4,530,232 A | 7/1985 | Smith |
| D281,977 S | 12/1985 | Sklaroff |
| 4,564,085 A | 1/1986 | Melocik et al. |
| 4,601,105 A * | 7/1986 | Yamazaki et al. ............. 33/600 |
| 4,639,091 A | 1/1987 | Huignard et al. |
| 4,794,783 A | 1/1989 | Eck |
| 4,823,589 A | 4/1989 | Maxwell, Jr. et al. |
| D307,894 S | 5/1990 | Siermiatkowski |
| 4,930,853 A | 6/1990 | Grego |
| 4,932,236 A | 6/1990 | Hinson |

(Continued)

FOREIGN PATENT DOCUMENTS

| | | |
|---|---|---|
| DE | 42 29 501 | 3/1994 |
| DE | 196 12 852 | 10/1997 |

(Continued)

OTHER PUBLICATIONS

European Search Report dated Mar. 19, 2004 for Application No. EP 02 25 5225.

(Continued)

*Primary Examiner* — John C Hong

(74) *Attorney, Agent, or Firm* — Frost Brown Todd LLC

(57) ABSTRACT

A fixturing system (10) for use with a frame-straightening repair bench (30) that assists in properly positioning fixture bases and providing verification of repairs. The fixturing system includes fixture bases, support assemblies (14), locating members (16), designed to couple with specific control points, and securing mechanisms to secure the vehicle during repair. The alignment targets and verification system provide proof that the fixturing system and replacement parts are properly positioned. If a repair cannot be made by pulling, the damaged areas of the vehicle can be removed and the fixturing system can help position and hold replacement parts until the repair is made substantially permanent, and the alignment targets and verification system provide proof that the repair is accurately made.

8 Claims, 7 Drawing Sheets

U.S. PATENT DOCUMENTS

| | | |
|---|---|---|
| 4,971,413 A | 11/1990 | Inoue |
| 4,973,112 A | 11/1990 | Kramer |
| 4,986,107 A | 1/1991 | Peyret |
| 4,997,283 A | 3/1991 | Danielson et al. |
| 5,016,464 A | 5/1991 | Tomelleri |
| 5,027,639 A | 7/1991 | Hinson |
| 5,029,397 A | 7/1991 | Palombi |
| 5,035,503 A | 7/1991 | Sadeh et al. |
| 5,093,747 A | 3/1992 | Dorschner |
| 5,111,680 A | 5/1992 | Ballard et al. |
| D327,878 S | 7/1992 | Fukutake et al. |
| 5,131,257 A | 7/1992 | Mingardi |
| 5,151,814 A | 9/1992 | Grinberg et al. |
| 5,189,899 A | 3/1993 | Hsu |
| 5,199,289 A | 4/1993 | Hinson |
| 5,251,013 A | 10/1993 | Danielson et al. |
| 5,253,033 A | 10/1993 | Lipchak et al. |
| 5,263,357 A | 11/1993 | Dumais |
| 5,355,711 A | 10/1994 | Chisum |
| 5,363,126 A | 11/1994 | Andrews |
| 5,448,403 A | 9/1995 | Harris |
| 5,573,450 A | 11/1996 | Markocic et al. |
| 5,596,430 A | 1/1997 | Hasegawa et al. |
| 5,596,900 A | 1/1997 | Pietrelli |
| 5,615,029 A | 3/1997 | Moddel et al. |
| 5,623,846 A | 4/1997 | Brewer, Jr. |
| 5,625,499 A | 4/1997 | Chen |
| 5,640,878 A | 6/1997 | Hinson |
| 5,767,976 A | 6/1998 | Ankerhold et al. |
| 5,794,511 A | 8/1998 | Sorbel |
| 5,801,834 A | 9/1998 | Danielson et al. |
| 5,825,523 A | 10/1998 | Amitai |
| 5,918,500 A | 7/1999 | Brewer, Jr. |
| 5,931,043 A | 8/1999 | Liegel et al. |
| 5,963,900 A | 10/1999 | Yamauchi |
| 5,986,778 A | 11/1999 | Kramer |
| 6,169,594 B1 | 1/2001 | Aye et al. |
| 6,344,937 B1 | 2/2002 | Sparrold et al. |
| 6,347,457 B1 | 2/2002 | Espinoza et al. |
| D457,161 S | 5/2002 | Groothuis et al. |
| 6,601,430 B2 | 8/2003 | McClellan |

FOREIGN PATENT DOCUMENTS

| | | |
|---|---|---|
| EP | 0 133 937 | 3/1985 |
| EP | 0 282 176 | 9/1988 |
| EP | 0 634 229 | 1/1995 |
| EP | 1 106 273 | 6/2001 |
| FR | 2 246 322 | 5/1975 |
| WO | WO 98/28768 | 12/1998 |

OTHER PUBLICATIONS

International Preliminary Examination Report dated Sep. 10, 2004 for Application No. PCT/US0232322.
International Search Report dated Dec. 23, 2002 for Application No. PCT/US02/31310.
International Search Report dated Jul. 7, 2003 for Application No. PCT/US02/32322.
Abstract for JP 06-270065.
Color Photographs (4 on 1 page) of Scanner as Shown in Chief Automotive Systems Brochure dated Jun. 1998.
Chief Automotive Systems Genesis Brochure (6 pages In a 3-page trifold format), dated Sep. 1996.
Chief Automotive Systems Genesis 2 Measuring System Owner's Manual (38 bound pages plus front, back, inside cover and warranty insert), dated May 1999.

\* cited by examiner

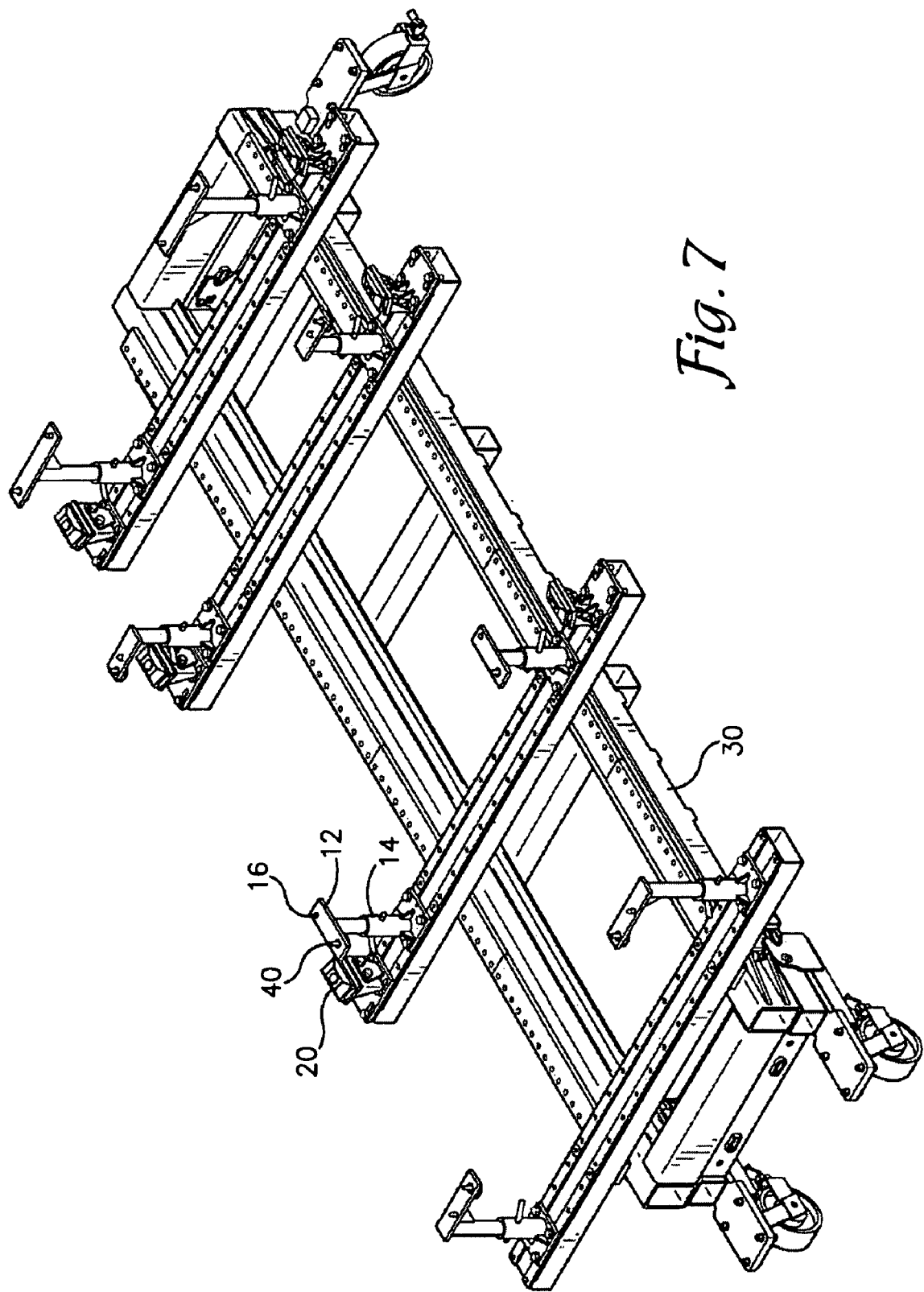

VEHICLE FIXTURE WITH ALIGNMENT TARGET

RELATED APPLICATIONS

The present U.S. non-provisional patent application is related to earlier-filed patents titled VEHICLE STRAIGHTENING BENCH WITH MOVABLE CARRIAGES FOR MOUNTING PULLING ASSEMBLIES, U.S. Pat. No. 6,701,770, filed Nov. 27, 2002, LASER SCANNER WITH PARABOLIC COLLECTOR, U.S. Pat. No. 6,765,664, filed Jan. 9, 2002, and VEHICLE MEASURING SYSTEM, U.S. Pat. No. 6,829,046, filed Dec. 1, 2000. The identified earlier-filed patents are hereby incorporated by reference into the present application as though fully set forth herein.

FIELD OF THE INVENTION

The present invention relates to systems for repairing and verifying repairs of vehicles. More particularly, the systems comprises fixtures, alignment targets, and laser scanners, along with repair mechanisms such as pulling towers and part replacement apparatuses.

BACKGROUND OF THE INVENTION

It is often necessary to repair the frame or other parts of a vehicle after the vehicle has been in a collision or accident that has bent or otherwise damaged the vehicle frame or other parts of the vehicle. In the U.S., such repair is commonly accomplished by securing the vehicle on a frame-straightening bench and exerting appropriate forces, at appropriate locations, in appropriate directions to bend the frame back into its normal position. However, bending the frame in this manner is not always possible or recommended, such as when the frame is constructed of aluminum rather than steel.

In Europe, repairs are commonly accomplished by removing and replacing the damaged part or portion of the frame rather than bending it. This requires the vehicle to be secured to a bench, and then the replacement portion is positioned and secured during the repair using appropriate fixtures. Unfortunately, the process of replacing a vehicle's frame can be laborious and time-consuming, particularly with regard to separating the body from the damaged frame and mounting the body onto the undamaged frame.

While the straightening machines are highly effective, they do not by themselves provide information as to the extent of straightening to be accomplished. The vehicles have manufacturer-provided reference points, such as reference openings or holes located at established points on the vehicles. Manufacturers also provide specifications for the correct three-dimensional spatial locations of these reference points relative to each other. If a vehicle is damaged, these reference points may be moved from their normal or "specification" positions relative to each other. Most, if not all, vehicle frame and unibody straightening jobs require that the vehicle reference points be returned to within manufacturer specifications.

In other repair systems, the dimensions of the vehicle's frame are measured and compared to pre-established standard (i.e., undamaged) dimensions, and, as necessary, the frame is adjusted on a frame-straightening machine until the measured dimensions correspond to the standard dimensions. In one system, for example, a laser scanner is positioned beneath the vehicle, and retro-reflective targets are hung from points on the frame. The laser scanner uses lasers to triangulate the positions of the targets and determine the width and length dimensions. Each target presents a bar code which specifically identifies it, and from which the laser scanner can extract the height dimension.

Unfortunately, each type of repair systems suffers drawbacks. In the fixture system, there is no verification that the fixtures themselves are in the proper positions, and thus, the vehicle may be straightened, or parts may be added, based on inexact coordinates, resulting in a faulty repair. Even the laser scanner may result in inaccurate measurements. Specifically, the accuracy of the triangulation calculation decreases with the square of the distance from the scanner, thereby limiting the range of the system to no more than a few meters.

SUMMARY OF THE INVENTION

The present invention overcomes the above-identified and other problems and disadvantages by providing a vehicle fixturing system that provides verification that a fixture is in the correct location and that the repair is done properly.

Generally, the fixturing system consists of a fixture base and support assembly attachable to a vehicle repair bench, a locating member on the fixture base for coupling with a vehicle reference point, a securing mechanism to secure the vehicle, and an alignment target located in close proximity to the fixture base.

In one embodiment, holes are placed on the fixture base at control points to allow the alignment target to be located directly below the locating member. In another embodiment, the alignment target is located directly on the fixture base. The use of alignment targets allow the repair technician to verify that the repair is done right.

In one embodiment, the locating member is a pin. In another embodiment, the locating member is a clamp.

In one embodiment, a securing mechanism secures the vehicle during repair. In one embodiment, fixture bolts are the securing mechanism and hold the damaged area at specific control points, as designated by the vehicle manufacturer. In another embodiment, clamps are the securing mechanism and hold pinch welds to restrain the vehicle while the damaged areas are pulled to reshape within manufacturer specifications. In yet another embodiment, both fixture bolts and clamps are used as the securing mechanism.

The fixturing system can, in one embodiment, be mounted to a Fuzion™ Shop Hopper repair bench, manufactured by Chief™ Automotive Technologies.

In one embodiment, the fixturing system is useable for repairs and replacing parts that require the vehicle body to be separated from the frame, such as may be the case when high strength steel or aluminum is used in the body.

These and other novel features of the present invention are described in more detail in the section titled DETAILED DESCRIPTION, below.

BRIEF DESCRIPTION OF THE DRAWING FIGURES

The present invention is described herein with reference to the following drawing figures, with greater emphasis being placed on clarity rather than scale:

FIGS. 6 and 7 are isometric views of various embodiments of the fixturing system.

DETAILED DESCRIPTION

With reference to the drawings figures, a vehicle fixturing system is herein described, shown, and otherwise disclosed in accordance with various embodiments, including a preferred embodiment, of the present invention. Broadly, the fixturing system 10 is comprised of locating members, support assemblies, and fixture bases designed to hold the vehicle at specific control points. Damaged areas of the vehicle can be pulled until they fit on the fixture bases, or they can be cut off and replaced. When the damaged areas are cut off and replaced, the fixture bases assist in positioning and holding replacement parts. The alignment targets, when used with lasers, or another verification system, provide electronic proof for the technician that the repair is done right. The alignment targets can also be used when setting up the fixture bases to assure they are in the proper locations. In one embodiment, alignment targets are placed directly on the fixture bases so the scanner can locate them. In another embodiment, the alignment targets are located substantially below the locating member. In yet another embodiment, alignment targets are placed in multiple locations for a given control point, useful when line of sight is impeded by a portion of the vehicle and the verification system cannot read one target. The software is programmable to select only one of the targets for verification, or calculate an average of more than one target. The targets are coded, such that the software is able to determine that a given target corresponds to a particular reference point. The software is further able to calculate, based on the target location, how much, if any, pulling is necessary to properly repair the vehicle. Thus, it will be appreciated that the apparatus and system of the present invention advantageously allows for minimizing time spent setting up fixtures, positioning replacement parts, and providing greater accuracy in verifying that a repair has been completed.

Figure 1:
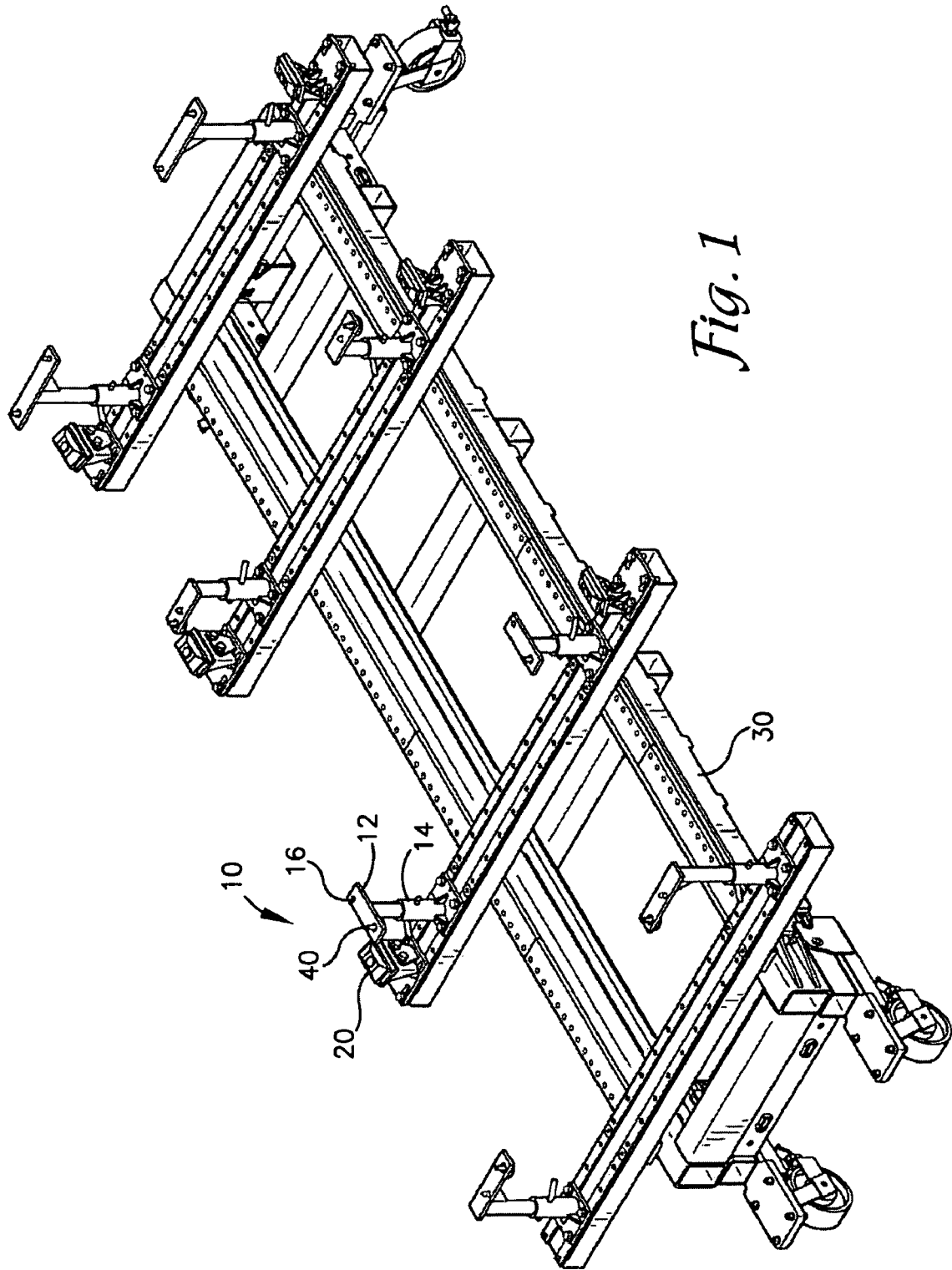
FIG. 1 is an isometric view of an embodiment of the fixturing system mounted to the Fuzion™ Shop Hopper repair bench.
Figure 2:
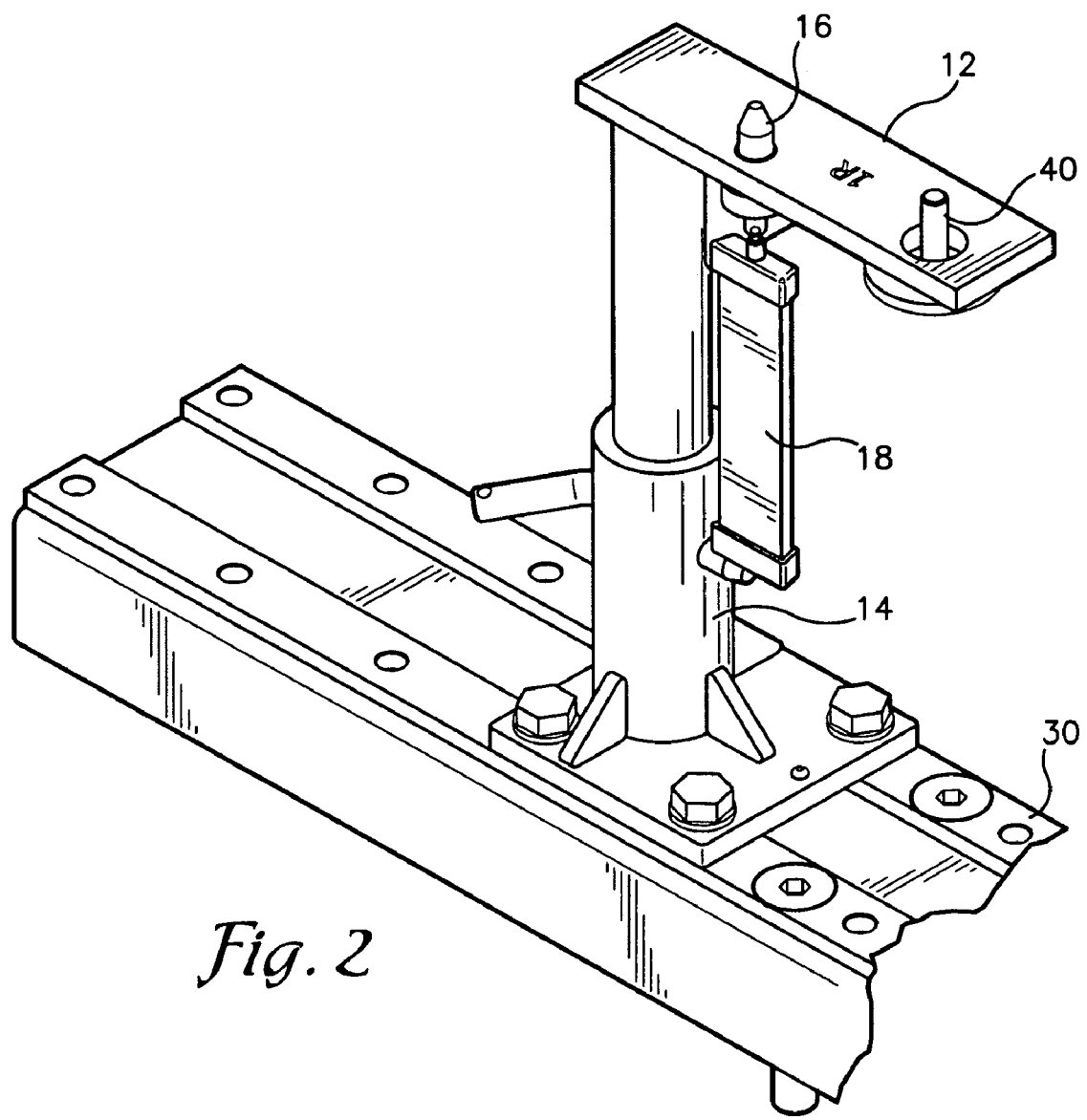
FIGS. 2 and 3 are isometric views of various embodiments of the fixturing system.
Figure 3:
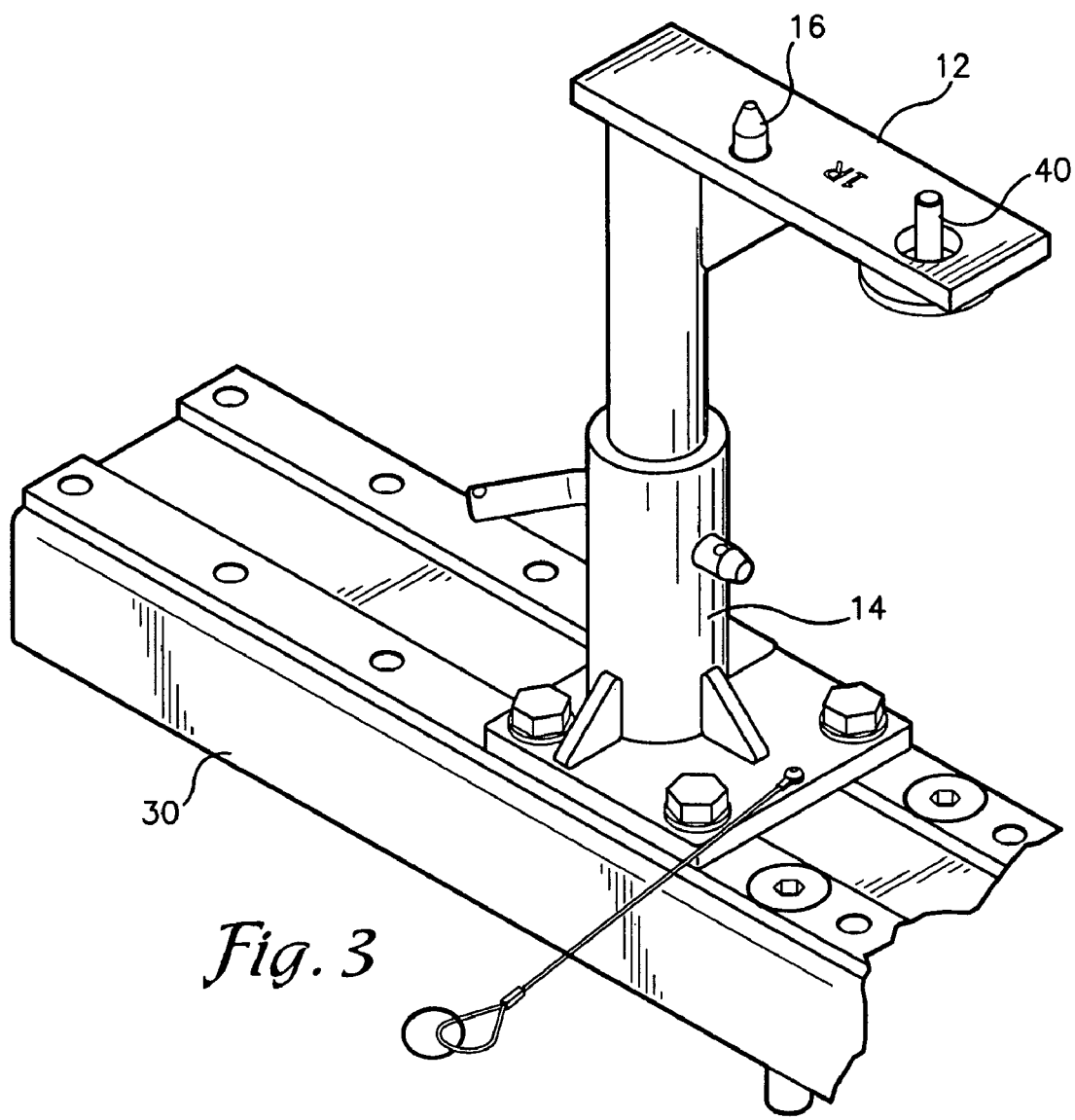
Figure 4:
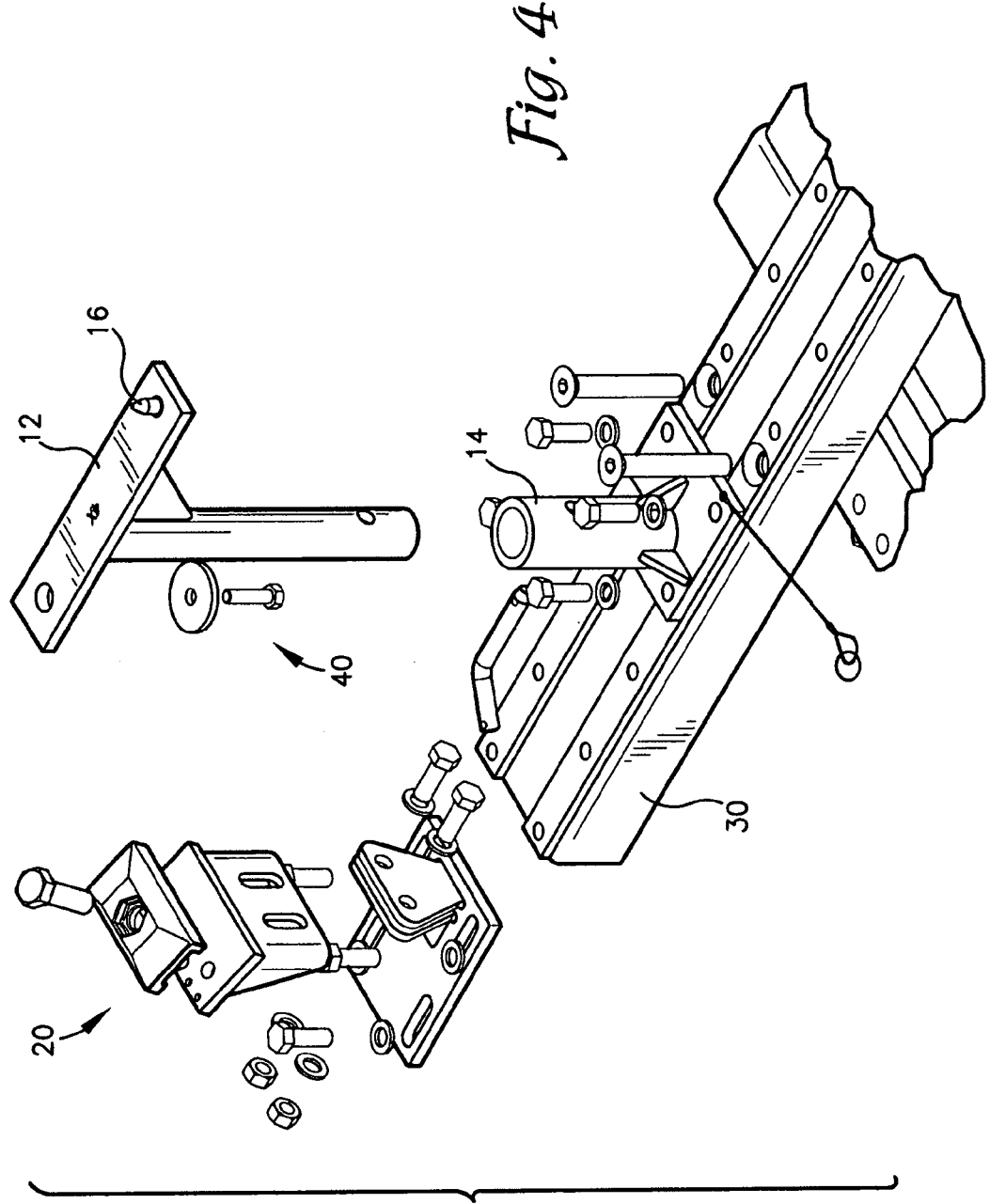
FIG. 4 is an exploded isometric view of an embodiment of the fixturing system.
Figure 5:
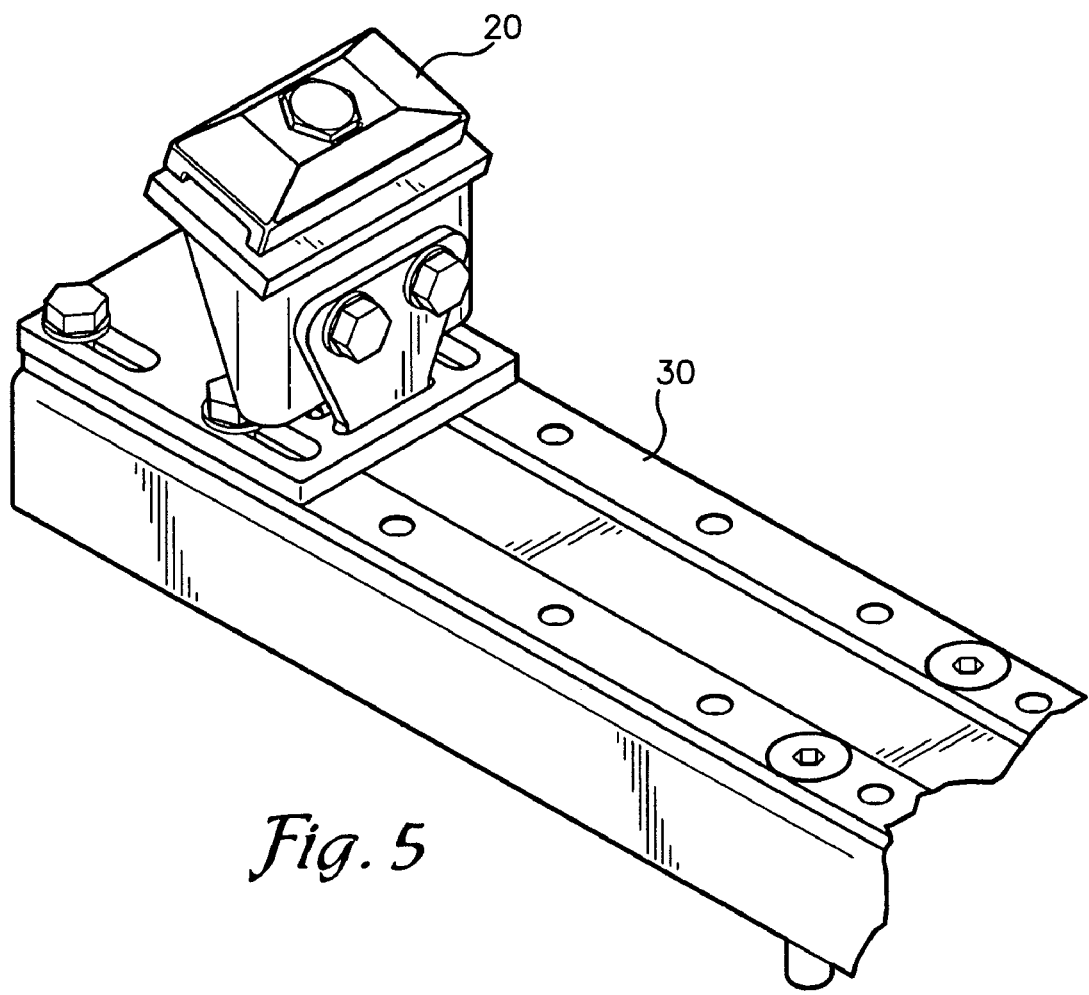
FIG. 5 is an isometric view of an embodiment of the securing mechanism.

Referring to FIGS. 1 and 2, an embodiment of the fixturing system 10 is shown. The fixturing system includes a fixture base 12 and support assembly 14 attachable to a repair bench, a locating member 16 on the fixture base for coupling with a vehicle reference point and an alignment target 18 located in close proximity to the fixture base. In one embodiment the fixture base is a flat plate with apertures and is attached to the support assembly. In another embodiment, the fixture base is contoured to fit firmly against the vehicle reference point. In one embodiment, the locating member is a pin, insertable into a selected vehicle reference point. In another embodiment, the locating member is a clamp, designed to couple with a selected vehicle reference point. In one embodiment, a securing mechanism secures the vehicle during repair. In one embodiment, fixture bolts 40 are the securing mechanism and hold the damaged area at specific control points, as designated by the vehicle manufacturer. In another embodiment, clamps 20 are the securing mechanism and hold pinch welds to restrain the vehicle while the damaged areas are pulled to reshape within manufacturer specifications. In yet another embodiment, both fixture bolts and clamps are used as the securing mechanism. High strength steel does not allow for much pulling, so if the repair requires extensive pulling, the damaged area is cut off and replaced. The fixturing system helps accurately position and hold the replacement part while the replacement part is attached to the vehicle. Some repairs require separating the frame from the body prior to any pulling, particularly when the body is composed of high strength steel. If the frame needs to be separated from the body, the fixturing system can hold the body while the frame is repaired.

Referring to FIG. 2, in one embodiment, holes are placed on the fixture base 12 at the control points to allow the alignment target 18 to be located directly below the locating member 16. In another embodiment, not shown in the figures, the alignment target is located directly on the fixture base 12. The use of alignment targets allow the repair technician to get electronic proof that the repair is done right.

Figure 6:
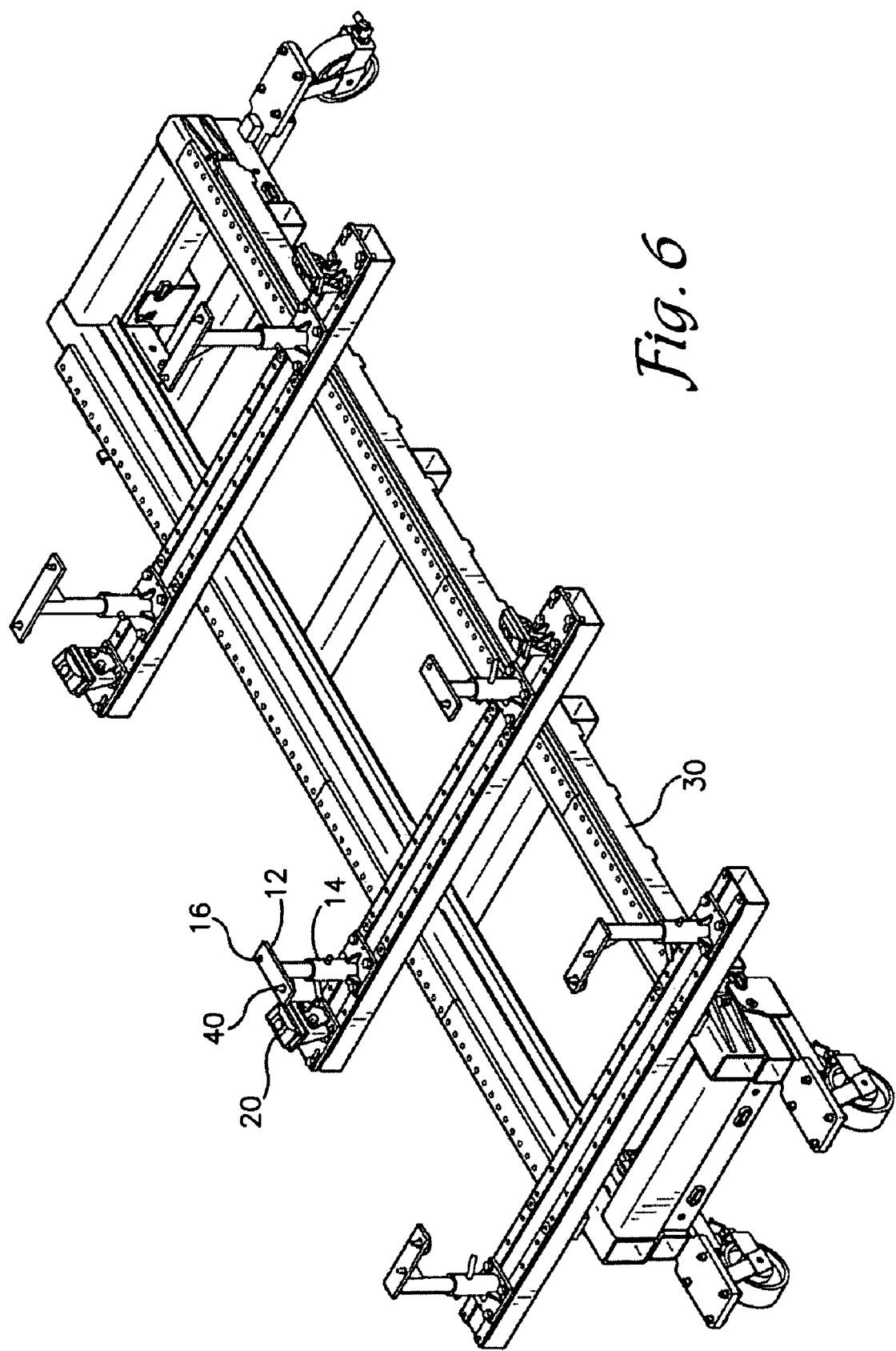

Referring to FIGS. 1, 6, and 7, the fixturing system 10 can, in various embodiments, be mounted to a Fuzion™ Shop Hopper repair bench 30, manufactured by Chief™ Automotive Technologies. In one embodiment, the process of making a repair using the fixturing system comprises the steps of mounting the fixturing system to the Fuzion™ Shop Hopper repair bench. Using locating members 16 on the fixture base 12 to locate reference holes in the vehicle, the vehicle is secured by using a securing mechanism. In one embodiment, a fixture bolt 40 is the securing mechanism. In another embodiment, a clamp 20 is the securing mechanism and secures the vehicle by holding the pinch welds of the vehicle. The alignment targets 18 are positioned, in one embodiment, directly below the control points. In another embodiment, the alignment targets are positioned directly on the fixture bases. In yet another embodiment, multiple alignment targets are positioned in multiple positions corresponding to one reference point, such that the software used by a verification system is able to determine which of the alignment targets should be used in calculating the proper position of the reference point or fixturing system. This embodiment is particularly desirable when an alignment target is shielded or partially shielded from view by other parts of the vehicle or repair bench and the software is able to ignore the shielded or partially shielded targets and use the visible targets in calculating deviation, if any, from the manufacturer specifications. The verification system provides verification the fixturing system is in the proper position by using, in one embodiment, a Velocity™ measuring system (manufactured by Chief™ Automotive Technologies). A repair is then made, wherein the repair requires a small amount of pulling. A verification system provides verification of the repair by using, in one embodiment, a Velocity™ measuring system. The verification system is further able to determine, based on codes on the individual targets, which reference point corresponds to each target or targets. If the alignment target is not in the expected location in space for a corresponding reference point, the software in the verification system is able to calculate, based on the actual location of the target, or targets, the actual deviation of the reference point, and is able to calculate the proper amount of pulling, if any, in order to properly return the damaged portion of the vehicle to within manufacturer specifications. If the damaged portions are not suitable for repair by pulling, replacement parts are held in the proper location by the fixturing system, verifiable by the verification system, until the repaired portions are substantially permanently attached to the vehicle.

In one embodiment, the fixturing system 10 is also useable for repairs and replacing parts that require the vehicle body to be separated from the frame, such as may be the case when a lot of high strength steel is used in the body. In one embodiment, the process of separating the vehicle's body from its frame comprises the steps of disconnecting the frame from the vehicle body and using locating pins 16 on the fixture base to locate reference holes on the vehicle and using fixture bolts 40 as well as clamps on pinch welds of the vehicle to further secure the vehicle body. When it is desired to replace the frame, the method further includes the steps of lowering the vehicle body onto a replacement frame, positioning alignment targets, and verifying the frame is properly positioned by using a verification system. In one embodiment, a Velocity™ measuring system is used as the verification system. Finally, the locating pins, fixture bolts, and clamps, are removed after substantially permanently attaching the replacement frame to the vehicle body.

Although the invention has been disclosed with reference to various particular embodiments, it is understood that equivalents may be employed and substitutions made herein without departing from the scope of the invention as recited in the claims.

Having thus described the preferred embodiment of the invention, what is claimed as new and desired to be protected by Letters Patent includes the following:

The invention claimed is:
1. A fixturing system comprising:
a fixture base including a locating member for coupling with a vehicle reference point;
a support assembly attachable to the fixture base on one end and a repair bench on an opposing end; and
an alignment target attachable to the fixture base.

2. The system as set forth in claim 1 wherein the alignment target is located substantially directly below the locating member.

3. The system as set forth in claim 1 wherein the alignment target is located directly on the fixture base.

4. The system as set forth in claim 1 further including a securing mechanism operable to secure a vehicle during repair.

5. The system as set forth in claim 4 wherein the securing mechanism comprises clamps operable to hold one or more pinch welds of the vehicle.

6. The system as set forth in claim 4 wherein the securing mechanism comprises fixture bolts.

7. The system set forth in claim 1, further including a verification system.

8. The system set forth in claim 1 wherein the locating member comprises a locating pin for insertion into a vehicle reference point.

* * * * *